United States Patent [19]

Yang et al.

[11] Patent Number: 5,340,875

[45] Date of Patent: Aug. 23, 1994

[54] BLENDS OF POLYBUTYLENE TEREPHTHALATE RESINS AND METHACRYLIC ACID-CONTAINING STYRENIC COPOLYMERS

[75] Inventors: Lau Shan Yang, Wilmington, Del.; Russell J. McCready, Pottsville, Pa.

[73] Assignee: Arco Chemical Technology, Greenvile, Del.

[21] Appl. No.: 19,407

[22] Filed: Feb. 18, 1993

Related U.S. Application Data

[63] Continuation of Ser. No. 745,590, Aug. 15, 1991, abandoned.

[51] Int. Cl.⁵ .................. C08L 25/12; C08L 55/02; C08L 67/02
[52] U.S. Cl. .................. 525/64; 525/166; 525/176; 428/480; 428/521; 428/523
[58] Field of Search .................. 525/64, 176, 166

[56] References Cited

U.S. PATENT DOCUMENTS

| | | | |
|---|---|---|---|
| 2,927,095 | 3/1960 | Witt | 260/45.5 |
| 3,035,033 | 5/1962 | Schweitzer | 260/88.1 |
| 3,644,574 | 2/1972 | Jackson et al. | 260/873 |
| 3,839,308 | 10/1974 | Carrock | 260/88.1 |
| 4,275,182 | 6/1981 | Priddy | 526/109 |
| 4,346,195 | 8/1982 | Hornbaker et al. | 525/176 |
| 4,377,647 | 3/1983 | Durbin et al. | 523/518 |
| 4,397,986 | 8/1983 | Hornbaker | 525/64 |
| 4,493,919 | 1/1985 | Durbin et al. | 524/505 |
| 4,526,923 | 7/1985 | Hornbaker et al. | 524/502 |
| 4,631,307 | 12/1986 | Hosoda et al. | 524/269 |
| 4,877,835 | 10/1989 | Tsuda et al. | 525/67 |
| 4,891,405 | 1/1990 | McCready | 525/64 |
| 4,912,144 | 3/1990 | McCready | 523/522 |
| 4,931,502 | 6/1990 | McCready | 525/64 |
| 4,935,309 | 6/1990 | Krieg et al. | 428/521 |
| 4,937,298 | 6/1990 | Miura et al. | 526/66 |
| 4,985,501 | 1/1991 | Udipi | 525/173 |

FOREIGN PATENT DOCUMENTS

| | | |
|---|---|---|
| 0257693 | 3/1988 | European Pat. Off. . |
| 0273897 | 7/1988 | European Pat. Off. . |
| 0359565 | 3/1990 | European Pat. Off. . |
| 0381432 | 8/1990 | European Pat. Off. . |
| 0405872 | 1/1991 | European Pat. Off. . |
| 0410607 | 1/1991 | European Pat. Off. . |
| 60-149654 | 8/1985 | Japan . |
| 60-226546 | 11/1985 | Japan . |
| 60-248708 | 12/1985 | Japan . |
| 61-252209 | 11/1986 | Japan . |
| 02294347 | 12/1990 | Japan | 525/64 |
| 90/14390 | 11/1990 | PCT Int'l Appl. . |
| 2076832 | 12/1981 | United Kingdom . |

OTHER PUBLICATIONS

Miura et al. *Polym. Mater. Sci. Eng.* 57, 780(1987).
Kuphal et al. *Polymer Preprints*, 32 (2). 46 (Jun. 1991).
Japanese Kokai 82-67643 (Japan Synthetic Rubber) *Chem. Abs.* vol. 97, 1982.
Jpn. Kokai No. 60-130,643 (*Chem. Abst.* 103, 1968421 Mitsui Petrochemical).
Jpn. Kokai No 61-168,630 (*Chem. Abst.* 105 210172v Danciel Chemical).
Jpn. Kokai No. 61-148,257 (*Chem. Abst.* 106, 51203h).

*Primary Examiner*—Patricia A. Short
*Attorney, Agent, or Firm*—Stephen D. Harper

[57] ABSTRACT

Thermoplastic molding compositions comprised of polybutylene terephthalate resin and a copolymer of a vinyl aromatic monomer and methacrylic acid are described. The compositions have unexpectedly enhanced heat and solvent resistance.

15 Claims, No Drawings

BLENDS OF POLYBUTYLENE TEREPHTHALATE RESINS AND METHACRYLIC ACID-CONTAINING STYRENIC COPOLYMERS

This application is a continuation of U.S. patent application Ser. No. 07/745,590, filed Aug. 15, 1991, now abandoned.

FIELD OF THE SPECIFICATION

The present invention is directed to thermoplastic molding compositions having superior solvent resistance, stiffness, heat resistance, and processability. More particularly, this invention relates to blends comprised of a polybutylene terephthalate resin and a copolymer of a vinyl aromatic monomer and methacrylic acid.

BACKGROUND OF THE INVENTION

Polybutylene terephthalate (PBT) is an important and commercially valuable engineering thermoplastic. The high crystallinity and rate of crystallization of polybutylene terephthalate make the resin quite resistant to organic solvents. However, the heat resistance of polybutylene terephthalate is not completely satisfactory for many purposes owing to its relatively low glass transition temperature (Tg) of only 52° C. Additionally, polybutylene terephthalate must be processed above the melting point of the polymer (225° C.). Since the polymer melt has very low viscosity and strength, unmodified polybutylene terephthalate is not well suited for certain types of forming or molding processes such as blow molding and thermoforming.

To improve the heat resistance of polybutylene terephthalate, the polyester has been blended with copolymers of styrene and maleic anhydride as described in U.S. Pat. No. 3,644,574, Japanese Kokai No. 57-67643, and European Patent Publication No. 257,693. However, it is also well known that combining these resins by melt mixing in an extruder results in molded products having a tendency to delaminate due to the gross immiscibility and incompatibility of the components. To overcome this problem, several different polymers have been proposed for use as compatibilizing agents in blends of this type as described, for example, in U.S. Pat. Nos. 4,891,405, 4,931,502, 4,912,144, and European Pat. Pub. No. 359,565. While molded products prepared from these compatibilizer-containing compositions exhibit excellent heat resistance, flexural modulus, impact strength, solvent resistance, and resistance to delamination, the compositions are not ideal since the compatibilizer may be either commercially unavailable or overly expensive. It would thus be desirable if the same beneficial improvements in the properties of polybutylene terephthalate could be achieved without the need to use a compatibilizer. Moreover, the incorporation of certain of these compatibilizers into blends of polybutylene terephthalate and styrene/maleic anhydride copolymer has a tendency to lower the heat resistance of the blend slightly as compared to the heat resistance of the blend in the absence of the compatibilizer.

We have now found that thermoplastic molding compositions having superior solvent resistance, stiffness, heat resistance, and processability may be obtained by blending polybutylene terephthalate with a copolymer of methacrylic acid and a vinyl aromatic monomer such as styrene. Surprisingly, the improvement in heat resistance is significantly greater than one would expect from the properties of the unblended components. In addition, the excellent overall balance of properties is achieved without any added compatibilizer, in contrast to the behavior of blends of polybutylene terephthalate with styrene/maleic anhydride copolymers. Without wishing to be bound by theory, it is believed that the acid functionality of the methacrylic acid comonomer interacts through hydrogen bonding with the hydroxyl end-groups, and possibly also with the ester groups of the polybutylene terephthalate. Good interfacial adhesion is thus accomplished without the need for a compatibilizer such as is needed for blends of PBT and styrene/maleic anhydride copolymers.

These results were highly unexpected in view of prior art teachings regarding blends of styrene/unsaturated carboxylic acid copolymers and polyethylene terephthalate, a polyester structurally similar to polybutylene terephthalate except for the presence of oxyethylene units instead of oxybutylene units in the polymer chain. U.S. Pat. No. 4,397,986, for example, teaches blends of polyethylene terephthalate and styrene/methacrylic acid copolymers. The improvement in the heat distortion resistance of a polyethylene terephthalate resin reported is simply that which would be expected in theory from blending a polymer having a high heat resistance (styrene/methacrylic acid) with a polymer having a low glass transition temperature (polyethylene terephthalate). That is, the styrene/methacrylic acid copolymer is dispersed in a continuous polyester phase and behaves in the same manner as a filler. As a consequence of this morphology, molded products made from these blends have poor solvent resistance and tend to delaminate readily.

Japanese Kokai No. 85-149654 teaches blends of polyethylene terephthalate and styrene/methacrylic acid copolymers wherein the amount of copolymer is from 0.1 to 50 parts by weight per 100 parts by weight of the polyester. This publication further teaches that the proportion of copolymer should not exceed 50 parts by weight per 100 parts by weight polyester (i.e., 33 weight % of the total blend) since mechanical properties such as tensile strength will be adversely affected.

Japanese Kokai No. 85-226546 teaches blend compositions comprised of thermoplastic polyester and aromatic vinyl copolymer containing methacrylic acid as comonomer wherein the amount of copolymer is from 2 to 50 parts by weight per 100 parts by weight PET. When the proportion of styrenic copolymer exceeds 50 parts (i.e., 33% of the total blend), the publication further teaches that the thermal resistance will be significantly lowered.

In contrast, the blends of the present invention wherein greater than 35 weight % polybutylene terephthalate is employed as the polyester component do not exhibit any significant loss of tensile strength. Moreover, the heat distortion resistance of the blends of this invention is markedly improved to a degree even greater than expected. Additionally, the instant blends have significantly better resistance towards organic solvents than analogous compositions containing polyethylene terephthalate as the polyester component.

SUMMARY OF THE INVENTION

This invention provides a thermoplastic molding composition comprising from 35 to 75 weight percent of a styrenic copolymer, wherein said styrenic copolymer is comprised of from 60 to 95 weight percent of a vinyl aromatic monomer and from 5 to 40 weight percent of methacrylic acid, and from 25 to 65 weight percent of a polybutylene terephthalate resin.

In a particular preferred embodiment of this invention, the thermoplastic molding composition is comprised of the styrenic copolymer, the polybutylene terephthalate resin, and an impact modifier. The impact modifier is obtained by polymerization of a second vinyl aromatic monomer, which may be the same as or different from the vinyl aromatic monomer in the styrenic copolymer, and methacrylic acid, in the presence of a diene rubber under free radical polymerization conditions. The total content of the styrenic copolymer and the impact modifier in the composition is from 35 to 75 weight percent, the weight ratio of styrenic copolymer:impact modifier is from 99:1 to 20:80, and the amount of polybutylene terephthalate resin is from 25 to 65 weight percent of the composition.

DETAILED DESCRIPTION OF THE INVENTION

The compositions of this invention are categorized by a co-continuous or substantially co-continuous morphology wherein the styrenic copolymer and polybutylene terephthalate phases are co-continuous. As used herein, the term "co-continuous" in relation to polymer blends means a distribution of two polymers in a blend such that both polymers are present as continuous phases. That is, neither polymer is identifiable as a dispersed phase in a continuous phase of the other polymer. The term includes the transitional area between separate dispersed phases and co-continuous phases. Without wishing to be bound by theory, it is believed that the co-continuous morphology exhibited by the blends of this invention is responsible for the improved performance of the blends as compared to blends of styrenic copolymers and polyethylene terephthalate. The latter blends generally have dispersed phase morphology.

The thermoplastic molding composition of this invention is comprised of from 35 to 75 weight, more preferably from 40 to 60 weight percent of a styrenic copolymer. The styrenic copolymer is comprised of, in polymerized form, from 60 to 95 weight percent of a vinyl aromatic monomer and from 5 to 40 weight percent of methacrylic acid. Preferably, the proportion of vinyl aromatic monomer is from 70 to 92 weight percent and the proportion of methacrylic acid is from 8 to 30 weight percent. The styrenic copolymer most desirably has a random, linear structure and a number average molecular weight in the range of from about 10,000 to 500,000 (more preferably, from about 20,000 to 350,000).

For reasons of cost and availability, styrene is the preferred vinyl aromatic monomer. However, other vinyl aromatic monomers may be used either alone or in combination with each other or with styrene. For example, substituted styrenes such as alkyl substituted styrenes (e.g., o-, m-, or p- methyl styrene, p-tert-butyl styrene, the various dimethyl styrenes, alpha-methyl styrene, and the like), halogenated styrenes (e.g., chlorostyrenes, dichlorostyrenes, bromostyrenes, tribromostyrenes, vinyl benzyl chloride), as well as styrenic monomers bearing other functional groups such as acetoxy-styrene will be suitable. Fused ring vinyl aromatic monomers such as the vinyl naphthalenes, and alkyl and/or halo-substituted vinyl naphthalenes may also be employed. Optionally, up to about 50 weight percent of the vinyl aromatic monomer may be replaced by one or more polymerizable unsaturated monomers such as olefins, aliphatic or aromatic esters of unsaturated carboxylic acids (e.g., methyl methacrylate), unsaturated ethers, unsaturated nitriles (e.g., acrylonitrile), unsaturated carboxylic acids other than methacrylic acid (e.g., acrylic acid), vinyl halides, vinyl esters, unsaturated dicarboxylic acid anhydrides (e.g., maleic anhydride) and the like.

Methods for making styrenic copolymers having the composition described hereinabove are well-known in the art and are described, for example, in U.S. Pat. Nos. 2,927,095, 3,839,308, 4,275,182, 3,035,033, 4,631,307, 4,937,298, Japanese Kokai Nos. 61-252209 and 60-248708, and European Pat. Nos. 381,432, 405,872, and 410,607. The teachings of these publications are incorporated herein by reference in their entirety.

Commercially available styrenic copolymers may also be used to prepare the blends of this invention. For example, the styrene/methacrylic acid copolymer resins available from Dinippon Ink and Chemicals, Inc., under the tradename "Ryulex" are suitable for use.

In one embodiment of this invention, the styrenic copolymer is rubber-modified (i.e., contains a rubber-like or elastomeric polymer). The incorporation of the rubber makes the overall polymer blend significantly tougher and less brittle (i.e., more ductile). Preferably, the styrenic copolymer is rubber-modified by copolymerization of the vinyl aromatic monomer and unsaturated monocarboxylic acid in the presence of the rubber. For this purpose, it is desirable that the rubber is a diene rubber, that is, an elastomeric polymer wherein at least one monomeric component is a diene. Such diene rubbers are well-known and, in many instances, commercially available and include for example, styrene-butadiene-styrene (S-B-S) and styrene-isoprene-styrene (S-I-S) block copolymers, styrene/butadiene and styrene/isoprene multiblock copolymers (which can have a radial, linear, star, or tapered structure), styrene/butadiene rubber (SBR), polybutadiene, polyisoprene, ethylene-propylene-diene monomer (EPDM) rubbers, styrene-butadiene-caprolactone block terpolymers, and the like and partially hydrogenated derivatives thereof. The amount of the rubber is not critical, but generally will be from about 5 to 65 parts by weight per 100 parts by weight of the styrenic copolymer.

An alternative and preferred method to improve the impact properties and toughness of the blends of this invention is the inclusion of an impact modifier as a third component of the composition. The impact modifier is advantageously a copolymer of a vinyl aromatic monomer and methacrylic acid grafted onto a diene rubber. The vinyl aromatic monomer may be the same as or different from the vinyl aromatic monomer employed in the styrenic copolymer component of the blend and most preferably is styrene. The diene rubber may be any of the elastomeric polymers prepared using a diene monomer which are listed above. Polybutadiene is preferred for use as the diene rubber. The weight ratio of (vinyl aromatic monomer+methacrylic acid): diene rubber in the impact modifier is desirably from about 2:1 to 1:5. Typically, the weight ratio of vinyl aromatic monomer:methacrylic acid in the impact modifier will be from 95:5 to 60:40.

The impact modifier may be prepared by free radical polymerization of the vinyl aromatic monomer and methacrylic acid in the presence of the diene rubber. In a preferred embodiment, suspension polymerization in an aqueous medium is employed, although bulk or solution polymerization may also be suitable. A typical suspension polymerization procedure involves forming a suspension of the vinyl aromatic monomer, the methacrylic acid monomer, the diene rubber, a free radical initiator, and, if needed, a suspending or emulsifying agent or chain transfer agent in water. The graft copolymerization typically is conducted at a temperature of from about 60° C. to 120° C. for a period of from 1 to 15 hours. It may be advantageous to add all or a portion of the monomers incrementally to the reaction mixture. Suspension polymerization methods of this type are well-known in the art. Any suitable free radical initiator such as a peroxide, hydroperoxide, azo compound or persulfate, suspending or emulsifying agent such as a water soluble polymer (e.g., polyvinyl alcohol, poly(unsaturated carboxylic acids), polyacrylamide, partially hydrolyzed polyacrylamide, gelatin, starch) or inorganic powder (e.g., tricalcium phosphate, bentonite, aluminum hydroxide, barium sulfate), or chain transfer agent (e.g., thiols, halides) can be employed. The diene rubber may advantageously be in latex or emulsion form. Methods of preparing impact modifiers of this type suitable for use in the compositions of this invention are described in Miura et al., Polym. Mater. Sci. Eng. 57, 780 (1987) and U.S. Pat. No. 4,631,307. The teachings of these publications are incorporated herein by reference in their entirety.

In the foregoing embodiment of this invention, the total amount of the styrenic copolymer and the impact modifier is from 35 to 75 weight percent (more preferably, 40 to 60 weight percent) of the composition while the amount of the polybutylene terephthalate is from 25 to 65 weight percent (more preferably, from 40 to 60 weight percent). The weight ratio of styrenic copolymer:impact modifier may be from 99:1 to 20:80, but more preferably is from 75:25 to 25:75.

The second essential component of the blends of this invention is a polybutylene terephthalate resin. Any of the commercially available resins of this type may be employed. Typically, such resins are prepared by the condensation polymerization of terephthalic acid or a terephthalic acid derivative and 1,4-butanediol. However, minor amounts (e.g., up to about 20 mole %) of other dicarboxylic or polycarboxylic acids and dialcohols or polyalcohols (i.e., polyols) may be incorporated if desired. The polybutylene terephthalate resin is preferably a linear copolyester wherein at least about 80 mole percent of the carboxylic acid component is terephthalic acid or a terephthalic acid derivative and at least about 80 mole percent of the alcohol component is 1,4-butanediol. Such resins will typically and most suitably have intrinsic viscosities (as measured in a 60/40 mixture of phenol and tetrachloroethane at 25° C.) of 0.7 to 2.0. Polybutylene terephthalate resins are available from General Electric under the tradename "VALOX", from Hoeschst-Celanese under the tradename "CELANEX", from Mobay under the tradename "POCAN", and from BASF under the tradename "ULTRADUR". The amount of polybutylene terephthalate resin in the composition is from 25 to 65 weight percent, but more optimally is from 40 to 60 weight percent.

The compositions of this invention, may, if desired, be additionally comprised of one or more additives such as fillers, colorants, stabilizers, flame retardants, blowing agents, plasticizers, processing aids (e.g., lubricants), and the like. To improve the stiffness and/or tensile strength of the blends, a reinforcing filler such as glass flakes or fibers, carbon or graphite fibers, plastic fibers (e.g., polyaramid fibers) metals, ceramics, silicates, asbestos, titanium dioxide, mica, talc, or the like may be incorporated. Typically, the amount of reinforcing filler will be in the range of from about 5 to 40 weight percent of the total weight of the reinforced blend.

The compositions of this invention may be prepared by any known or conventional procedure for the blending of thermoplastic polymers. For example, the blend components may be combined and then melt-processed on a single- or twin-screw extruder. Processing temperatures of from about 200° C. to 325° C. will generally be suitable. The extruded blend may be chopped or otherwise formed into pellets or beads for ease in handling, during packaging, shipping, storage, and use in a molding operation.

The compositions of this invention may be shaped into useful molded articles using any of the known procedures for forming or processing thermoplastic. Suitable methods include, for example, blow molding, injection molding, thermoforming, extrusion molding, rotational molding, and the like. A laminate containing one or more layers in the form of a thin film of the blend composition and one or more layers of a different thermoplastic resin or resins may also be prepared, if desired, using a co-extrusion process or similar process. The different thermoplastic resin may be a styrenic type resin such as general purpose polystyrene, high impact polystyrene, styrene/maleic anhydride copolymers, ABS resin, styrene/methyl methacrylate copolymer, styrene/maleic anhydride/acrylonitrile terpolymer, styrene/maleic anhydride/methyl methacrylate terpolymer, styrene/methacrylic acid copolymers, styrene/acrylic acid copolymer, styrene/maleimide or N-substituted maleimide copolymer, oxazoline-functionalized polystyrene, and the like. It is expected that laminates having good adhesion between the layers may be prepared without the need for an intermediate bonding or adhesive layer.

From the foregoing description, one skilled in the art can readily ascertain the essential characteristics of this invention, and, without departing from the spirit and scope thereof, can make various changes and modifications of the invention to adapt it to various uses, conditions, and embodiments.

The following examples further illustrate the compositions of this invention, but are not limitative of the invention in any manner whatsoever.

EXAMPLE 1

This example demonstrates the preparation of a copolymer of styrene and methacrylic acid containing 20 weight percent polymerized methacrylic acid. A four liter resin reactor was charged with:

|  | grams |
| --- | --- |
| Styrene | 700 |
| Methacrylic Acid | 176 |
| Benzoyl peroxide (initiator) | 2.75 |
| Water | 1600 |
| Polyacrylamide (Percol LT27) | 2.75 |

The mixture was stirred at 580 rpm using two 3 inch turbine blades with a ½ inch baffle. The suspension polymerization was carried out at 90° C. for 6 hours. The bead polymerization product was collected on a 100 mesh screen and rinsed to yield 850 g of copolymer in bead form. The copolymer had a number average molecular weight of 120,000 and a polydispersity of 2.3.

EXAMPLE 2

This example demonstrates the use of a different suspension polymerization procedure to prepare a styrene/methacrylic acid copolymer suitable for use in the compositions of this invention. A four liter resin reactor was charged with:

|  | grams |
|---|---|
| Water | 2000 |
| Tricalcium phosphate | 80 |
| Sodium sulfate | 160 |
| Styrene | 720 |
| Methacrylic acid | 160 |
| Azobisisobutyronitrile | 2.5 |
| Benzoyl peroxide | 1.2 |

The reaction mixture was heated at 80° C. for 3.5 hours, 85° C. for 2 hours, and 90° C. for 1.5 hours. The product was then collected, rinsed with dilute hydrochloric acid, and water, and dried to yield 850 g copolymer containing about 18 weight percent polymerized methacrylic acid as determined by titration.

EXAMPLE 3

This example shows the preparation of an 85% styrene/15% methacrylic acid copolymer on a large scale. To a 50 gallon reaction was added:

|  |  |
|---|---|
| Water | 180 lbs |
| Tricalcium phosphate | 1 lb |
| Polyvinyl alcohol | 77 g |
| Styrene | 85 lbs |
| Methacrylic acid | 15 lbs |
| Benzoyl peroxide | 160 g |
| t-Butyl perbenzoate | 50 g |

The mixture was heated at 90° C. for 5 hours. A solution of 5 g of sodium dodecyl benzenesulfonate in 100 mL water was then added to the reactor and the mixture heated at 130° C. for 2 hours. After cooling, the product was collected, rinsed with diluted hydrochloric acid and water, and then dried to yield about 90 lbs of copolymer.

EXAMPLE 4

This example demonstrates the preparation of a 50/50 blend of a styrene/methacrylic acid copolymer and polybutylene terephthalate. A mixture of 900 g of "VALOX 260" (a polybutylene terephthalate resin sold by General Electric) and 900 g of the styrene/methacrylic acid copolymer prepared as described in Example 2 was blended and extruded in a twin screw extruder at a temperature of 250° C. The pellets thus obtained were then injection molded into specimens for testing. Samples of the PBT resin and the styrenic copolymer alone were also separately molded for comparative purposes. The physical properties measured are shown in Table I. The blend exhibited a tensile strength equivalent to that of each component alone, while the flex modulus of the blend unexpectedly was greater than that of either component. Additionally, the heat resistance of the blend was also higher than was predicted from the component DTUL values. That is, while the DTUL value of the blend was expected to be about 186° F. (the average of the DTUL values of the PBT and styrenic copolymer), the observed DTUL value was found to be 210° C. (more than 20° C. higher than the predicted value).

TABLE I

|  | Blend | Styrenic Copolymer | PBT |
|---|---|---|---|
| Tensile Strength, psi | 8000 | 8000 | 7500 |
| Flex Modulus, Kpsi | 550 | 430 | 36 |
| DTUL, °F. | 210 | 242 | 130 |

EXAMPLE 5

The superior solvent resistance of the blends of this invention is demonstrated by this example. A 50/50 blend of the styrene/methacrylic acid copolymer prepared in Example 3 (15% methacrylic acid content) and "VALOX 260" polybutylene terephthalate resin was prepared and molded following the procedure of Example 4. The molded tensile bars were then immersed in various solvents at room temperature for 2 days before measuring tensile strength. The results obtained (Table II) show that the blend has good resistance towards solvents, particularly alcohol solvents such as methanol.

TABLE II

| Solvent | Tensile Strength, psi |
|---|---|
| None | 8000 |
| Methanol | 8000 |
| Toluene | 4500 |
| Methylene Chloride | 3500 |

EXAMPLE 6-11

These examples demonstrate the unexpectedly high improvement in the heat resistance of a polybutylene terephthalate resin attained by blending a styrene/methacrylic acid copolymer into the polyester. Five "VALOX 260" PBT resin blends containing from 20 to 80 weight percent of the styrenic copolymer were prepared using the copolymer of Example 3 and the procedure of Example 4. The DTUL values observed (Table III) were lower than expected at low (20%) and high (80%) proportions of the styrenic copolymer, while the blends having intermediate amounts of styrenic copolymer had DTUL values markedly higher than predicted.

TABLE III

| Example | % Styrenic Copolymer | % PBT | DTUL, °F. Observed | DTUL, °F. Predicted | DTUL, °F. Difference |
|---|---|---|---|---|---|
| 6* | 0 | 100 | 130 | 130 | 0 |
| 7* | 20 | 80 | 145 | 152 | −7 |
| 8 | 40 | 60 | 192 | 175 | +17 |
| 9 | 50 | 50 | 198 | 186 | +12 |
| 10 | 60 | 40 | 213 | 197 | +16 |
| 11* | 80 | 20 | 213 | 220 | −7 |
| 12* | 100 | 0 | 242 | 242 | 0 |

*Comparative example

EXAMPLE 13

This example compares the properties of the blends of this invention with the properties of the prior art blends of polyethylene terephthalate and styrene/methacrylic acid. The blends were prepared using 50 parts by weight styrene/methacrylic acid copolymer (10% methacrylic acid) and 50 parts by weight of either polybutylene terephthalate or polyethylene terephthalate and the procedure of Example 4. While the blend containing polybutylene terephthalate had an intertwined co-continuous morphology when examined by transmission election microscopy, the polyethylene terephthalate blend exhibited a dispersed phase morphology wherein the styrenic copolymer was the dispersed phase. Additionally, the PBT-containing blend had a DTUL value (264 psi) more than 40° F. higher than the PET-containing blend (202° F. vs. 159° F.). Another difference observed was that the PET-containing blend was cross-linked, while the PBT-containing blend had a satisfactorily low melt index of 3.65 g/10 mm (condition L). Furthermore, the blend prepared in accordance with this invention had considerably greater solvent resistance than the prior art blend containing polyethylene terephthalate (Table IV). The tensile bars were immersed in solvent for three days, then tested after drying for at least one day.

TABLE IV

| Solvent | % Retention of Tensile Strength | |
|---|---|---|
| | SMAA/PBT | SMAA/PET* |
| Methylene Chloride | 59 | 34 |
| Toluene | 43 | 27 |

*Comparative example

EXAMPLE 14

This example demonstrates the preparation of an impact modifier suitable for use in the blends of this invention. A four liter resin reactor was charged with

| | grams |
|---|---|
| Water | 1000 |
| Styrene | 400 |
| Methacrylic Acid | 100 |
| Polybutadiene Latex | 1100 |
| Potassium Persulfate | 1.5 |
| t-Dodecylthiol | 1.0 |

The polybutadiene latex was "TYLAC 68137-00" emulsion purchased from Reichhold and contained 45% solids. The mixture was heated at 85° C. for 2 hours and than at 88° C. for an additional 4 hours. A brine solution (30 g sodium chloride in 200 mL water) was then added to coagulate the impact modifier formed. The powdery product was collected and washed to yield 960 g of the impact modifier.

EXAMPLE 15

This example illustrates the use of an impact modifier made by graft copolymerization of styrene, methacrylic acid, and a diene rubber in the blends of this invention. A mixture of 375 g styrene/methacrylic acid copolymer (Example 1), 375 g of the impact modifier prepared in Example 14, and 750 g of "VALOX 260" polybutylene terephthalate resin was blended and molded using the procedure of Example 4. The molded articles made from the blend thus obtained exhibited extremely good impact strength and toughness.

We claim:

1. A thermoplastic molding composition consisting essentially of
    a) from 40 to 60 weight percent of a styrenic copolymer, wherein said styrenic copolymer consists essentially of from 60 to 95 weight percent of styrene and from 5 to 40 weight percent of methacrylic acid; and
    b) from 40 to 60 weight percent of a polybutylene terephthalate resin.

2. The composition of claim 1 wherein the polybutylene terephthalate resin is a linear copolyester of at least about 80 mole percent terephthalic acid and at least about 80 mole percent 1,4-butanediol.

3. The composition of claim 1 wherein the styrenic copolymer consists essentially of from 70 to 92 weight percent of styrene and from 8 to 30 weight percent of methacrylic acid.

4. The composition of claim 1 wherein said composition has a co-continuous morphology.

5. The composition of claim 1 additionally consisting of at least one additive selected from the group consisting of fillers, colorants, stabilizers, flame retardants, blowing agents, and processing aids.

6. A molded article produced by molding the composition of claim 1.

7. A thermoplastic molding composition consisting essentially of
    a) a styrenic copolymer, wherein said styrenic copolymer consists essentially of from 60 to 95 weight percent of styrene and from 5 to 40 weight percent of methacrylic acid;
    b) a polybutylene terephthalate resin; and
    c) an impact modifier obtained by polymerization of styrene and methacrylic acid in the presence of a diene rubber under free radical polymerization conditions, the weight ratio of (styrene and methacrylic acid): diene rubber being from 2:1 to 1:5;
wherein the total amount of (a) and (c) combined is from 40 to 60 weight percent of the composition, the weight ratio of (a):(c) is from 99:1 to 20:80, and the amount of (b) is from 40 to 60 weight percent of the composition.

8. The composition of claim 7 wherein the diene rubber is polybutadiene.

9. The composition of claim 7 wherein the weight ratio of styrene:methacrylic acid in the impact modifier is from 95:5 to 60:40.

10. The composition of claim 7 additionally consisting of at least one additive selected from the group consisting of fillers, colorants, stabilizers, flame retardants, blowing agents, and processing aids.

11. A molded article produced by molding the composition of claim 7.

12. A thermoplastic molding composition consisting essentially of:
    a) a styrenic copolymer wherein said styrenic copolymer is comprised of from 70 to 92 weight percent styrene and from 8 to 30 weight percent methacrylic acid;
    b) a polybutylene terephthalate resin; and
    c) an impact modifier obtained by free radical polymerization of styrene and methacrylic acid in the presence of a polybutadiene rubber, the weight ratio of styrene:methacrylic acid being from 95:5 to 60:40 and the weight ratio of (styrene+methacrylic acid): polybutadiene rubber being from 2:1 to 1:5;
wherein the total amount of (a) and (c) combined is from 40 to 60 weight percent of the composition, the weight ratio of (a):(c) is from 75:25 to 25:75, and the amount of (b) is from 40 to 60 weight percent of the composition.

13. A thermoplastic molding composition consisting essentially of a) from 40 to 60 weight percent of a rubber-modified styrene copolymer, wherein said rubber-modified styrene copolymer consists essentially of (i) 100 parts by weight of a styrenic copolymer consisting essentially of from 60 to 95 weight percent of styrene and from 5 to 40 weight percent of methacrylic acid and (ii) from 5 to 65 parts by weight of a diene rubber; and b) from 40 to 60 weight percent of a polybutylene terephthalate resin.

14. The composition of claim 13 wherein the diene rubber is polybutadiene.

15. The composition of claim 13 wherein the rubber-modified styrene copolymer is obtained by polymerization of styrene and methacrylic acid in the presence of the diene rubber.

* * * * *